E. J. BERG.
METHOD AND APPARATUS FOR MEASURING THE FLOW OF FLUIDS.
APPLICATION FILED APR. 22, 1914.

1,156,660.

Patented Oct. 12, 1915.

Witnesses:
George H. Tilden
J. Ellis Glen

Inventor:
Ernst J. Berg,
by
His Attorney.

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

METHOD AND APPARATUS FOR MEASURING THE FLOW OF FLUIDS.

1,156,660.     Specification of Letters Patent.     Patented Oct. 12, 1915.

Application filed April 22, 1914. Serial No. 833,804.

*To all whom it may concern:*

Be it known that I, ERNST J. BERG, a citizen of the United States, residing at Schenectady, county of Schenectady, State of New York, have invented certain new and useful Improvements in Methods and Apparatus for Measuring the Flow of Fluids, of which the following is a specification.

This invention relates to a novel and useful method of measuring or determining the flow of fluids through conduits or passages, and to apparatus for applying or carrying out said method.

The underlying principle of the method is that if a body or radiator, maintained at a temperature preferably higher than the temperature of the fluid to be measured, be subjected to the action of the flowing fluid, the heat lost to the fluid by said body, or the flow of heat between the body and the fluid depends upon and is practically proportional to the quantity of fluid flowing, and the energy supplied to the body to maintain it at the desired temperature, preferably a temperature of constant value, is a measure of the flow.

Some novel and useful forms of apparatus embodying the principle of the method outlined above are illustrated in the accompanying drawing and described in subsequent portions of the specification. For convenience, the apparatus will be described as used for measuring the flow of steam through a main or pipe but its use is not limited to that particular fluid. It can be utilized to measure air, gas, etc., as will be apparent to those skilled in the art. Any suitable heating means or radiator may be employed in the apparatus so long as its temperature condition can be determined and the supply of energy required to maintain it at the desired temperature can be measured with the necessary degree of accuracy. An electrically heated means is preferably used.

Figure 1:
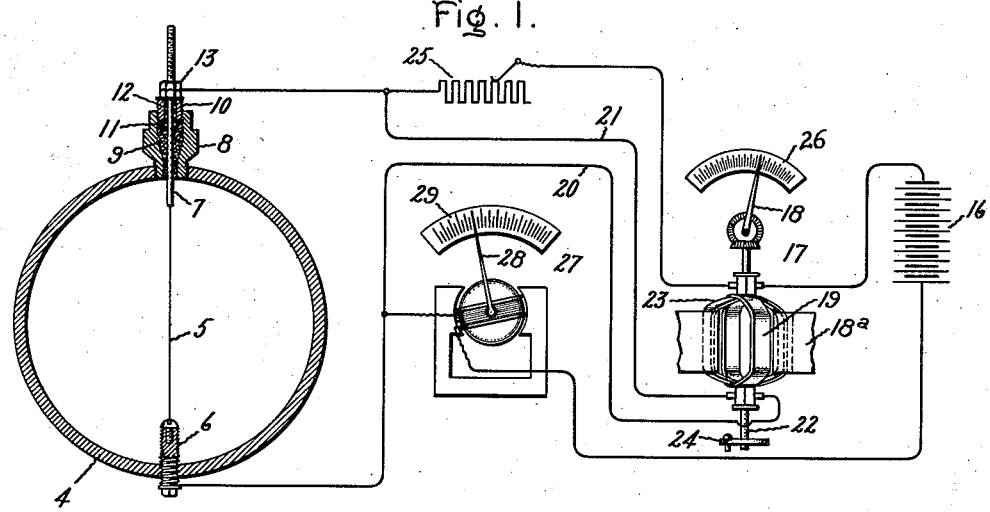
Figure 2:
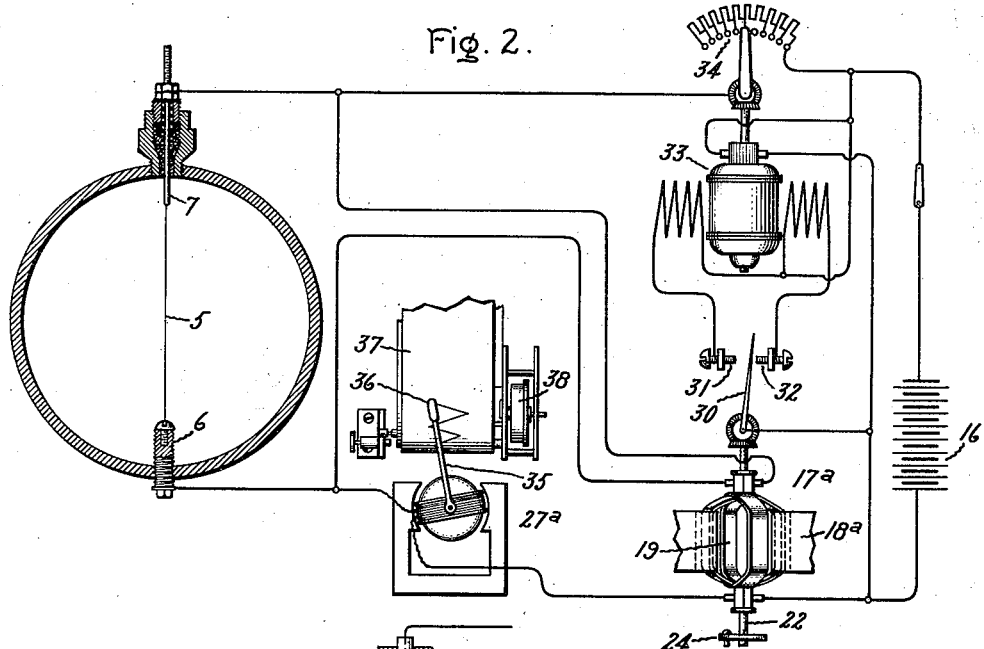
Figure 3:
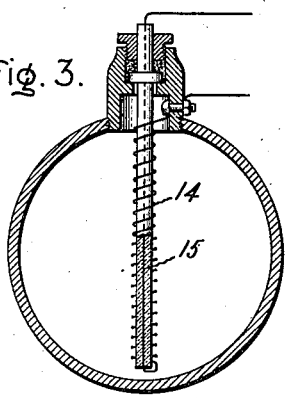

Referring to the drawing, Figure 1 is a diagrammatic view of a meter and its connection to the main; Fig. 2 is a diagrammatic view of a meter and its connection to a main, this form of meter being more nearly automatic in its action than the form shown in Fig. 1; and Fig. 3 shows a modification of one of the meter parts.

The conduit 4 through which the fluid to be metered flows can be of any size required by the conditions of the plant of which it forms a part and can have its axis horizontal, or vertical, or inclined to those directions. It can be the main conduit or a shunt conduit which conveys a known proportion of the total flow through the principal and shunt conduits. Arranged diametrically of the conduit is a radiator in the form of a conductor 5 made of some material that has a suitable resistance and that will not be corroded or attacked by the measured fluid even when heated to relatively high temperature. This conductor is preferably made of a material that also has a high temperature coefficient. It should be located at a point that is so far removed from obstructions and bends in the conduit as to be substantially unaffected by eddy currents set up by them.

One end of the conductor 5 is attached to a plug 6, Figs. 1 and 2, secured in the wall of the conduit. This plug need not be insulated from said wall. The other end of the conductor is enlarged, or secured to a member 7 of larger size, and mounted in a plug 8 secured in the wall of the conduit opposite the plug 6. The plug 8 has a chamber filled with insulating packing material 9, such for example as asbestos or some other material that will not be affected by the fluid or the heat coming therefrom. The packing 9 surrounds a portion of the member 7 and is held in place by a threaded gland 10 and a washer 11. A bushing 12 insulates the conductor from the gland 10. Nuts 13 hold the end of the conductor in place and afford means for attaching or connecting it to another conductor. In Fig. 3, a modified form of conductor is shown, this conductor 14 being coiled about an insulating support 15 made of a material that is unaffected by the fluid or its temperature. The conductor of Figs. 1 and 2 is, however, simpler in its structure and has proved effective in service. For these reasons it is usually to be preferred.

Referring to Fig. 1, the conductor 5 is, due to its resistance, heated by the current supplied from a battery 16, or other source of current. The degree to which the conductor is heated is such that its temperature is higher than the temperature of the steam or fluid being measured, so that it is cooled to a greater or less extent by the steam flowing over it. Its temperature is also preferably made so high that any moisture in the steam passes by the conductor in the spheroidal state without affecting the action of the meter, and hence the steam does not have to be superheated before it is measured. The meter will, of course, also measure superheated steam. When the temperature of the conductor changes, due to the cooling action of the stream of steam, the resistance of the conductor varies. As heat is conveyed away from the conductor, the loss is made good and the conductor kept at a substantially constant temperature and resistance by supplying the necessary quantity of electrical energy which is transformed into heat by the resistance of the conductor. If the flow increases for a time, the supply of energy must be increased. When the flow decreases the conductor tends to rise in temperature and the supply of energy must be decreased. The instrument or device 17, Fig. 1, enables the operator or observer to determine when and to what extent the quantity of energy supplied to the conductor must be varied. This instrument has an indicator or pointer 18 that is moved by the resultant action of the torque due to two opposed coils which move in a constant field set up by the permanent magnets 18ª. The coil 19 is connected to the terminals of the conductor 5 by suitable conductors 20 and 21 and exert a torque proportional to the voltage impressed on the conductor. The torque on the pivot or shaft 22, due to the coil 19, is opposed by the torque on the pivot exerted by the current flowing through the coil 23 which is in series with the conductor 5. When the temperature of the conductor 5 is of the desired degree, the torques exerted by the two coils 19 and 23 are equal and opposite and the indicator 18 stands in the position shown. The spring 24 tends to return the indicator to this position. If the temperature of the conductor 5 varies, due to variations in the flow of steam, the effects on the pointer or arm 18 of the torques due to the two coils, are no longer balanced and the pointer moves from the position shown, in one direction or the other, the direction depending upon whether the temperature of the conductor is above or below normal. The instrument 17 thus acts as a temperature indicator and enables the operator to adjust the resistance 25 so as to increase or decrease, as may be necessary, the current flowing through the conductor 5. The resistance is adjusted until the pointer returns to normal position and the scale 26 can under certain conditions be graduated in terms of the amount of resistance to be added to or taken out of the circuits, if desired.

It will be understood that the instrument 17 may take various forms, the essential feature of the same being that it shall indicate the ratio between two currents, one of which is proportional to the drop in potential across the radiator 5, and the other of which is proportional to the current flowing therethrough. In substance the instrument is an ohmmeter. It will be further understood that the precise form of this instrument forms no part of the present invention, such instruments being well known in the electrical measuring instrument art.

The quantity of steam passing through the main 4 varies and is proportional to the mean velocity of the stream of steam in the main, the velocity also varying at different points of the cross-section. The conductor or radiator 5 extending as it does diametrically across said cross-section, passes through these regions of different velocities and the heat conveyed away from it by the flowing steam depends upon the velocity. Hence, the electric current which is supplied to heat the conductor 5 and maintain its temperature constant, is a measure of the heat carried away by the flowing steam, and, consequently, is a measure of the quantity of steam passing through the main in a given time. Obviously, the arrangement and structure of the conductor or radiator can be varied to meet the conditions found in conduits or passages whose cross-section is other than circular. The instrument or device 27 has a coil in circuit with the conductor 5 and the battery 16 that moves the pointer 28 a distance proportional to the current flowing in the circuit so that it shows on a suitably graduated scale 29 the rate of flow in terms of pounds of steam per second or other appropriate units.

In Fig. 2, the temperature indicator 17ª operates a switch or arm 30 in the same manner that the pointer or arm 18, Fig. 1, is operated. The arm stands between the contacts 31 and 32, as illustrated, when the temperature of the conductor 5 is normal and it is moved into engagement with one or the other of the contacts when the temperature varies above or below normal. Thus, it may serve in part as a visual indicator. When in engagement with one contact, the arm causes an excitation of the field of the electric motor 33 in such a way as to cause the motor to move the arm of the rheostat 34 to reduce the resistance in the circuit and thereby increase the heating current. When the switch is moved against the other contact, the field of the motor is so excited as to cause said motor to move the arm of the rheostat in the opposite direction and decrease the heating current. The current is thus automatically varied in such a manner as to keep the conductor 5 at a constant temperature and this current which depends upon the quantity of steam flowing through the main, moves the arm 35 of the instrument or device 27ª. The movement of said arm causes a pen 36 carried by it to show upon the chart or sheet 37, driven by the clock-work 38, the rate of flow at any given moment, and from the curve drawn by the pen the total flow for any period of time can be computed. The instruments 27 and 27ª can be calibrated in terms of the flow per square inch if desired. Then the instrument readings must be multiplied by the ascertained area of the conduit to obtain the total flow.

This meter, as will be evident from the foregoing, does not require the introduction of any special fittings in the pipe line, nor does it objectionably obstruct the interior of the pipe. The holes for the plugs 6 and 8 can be drilled and tapped in a short time. The mounting of the conductor 5 in the pipe is then a relatively simple and easy operation. If it is not desired to keep the conductor in the pipe for continued observations, it is readily removed and the openings in the wall of the pipe closed by pipe plugs. The amount of energy used in the meter is small, so small that it does not appreciably affect the temperature of the flowing steam. Observations and tests also show that the meter is evidently independent of the static pressure of the steam, or at least that such a condition holds true over a wide range of pressures.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The method of measuring the flow of steam, air and other fluids, which comprises determining the amount of energy required to maintain at a constant temperature a body upon which said fluid exerts a cooling action as it flows.

2. The method of measuring the flow of steam, air and other fluids, which comprises determining the amount of electrical energy required to maintain at a constant temperature higher than the temperature of the fluid, an electrical resistance means upon which the flowing stream of fluid exerts a cooling action dependent upon its rate of flow.

3. The method of measuring the flow of steam, air and other fluids, which comprises determining the amount of electrical energy required to maintain at a constant temperature higher than the temperature of the fluid, an electrical resistance means immersed in the flowing stream of fluid and exposed to the mean velocity thereof.

4. The method of determining the flow of steam, air and other fluids, which comprises heating by an electric current to a temperature higher than the temperature of the fluid, a means arranged in such relation to the flowing fluid that its temperature is affected by the fluid, and determining the flow by measuring the heating current.

5. The method of determining the flow of steam, air and other fluids, which comprises heating a suitable means by an electric current, said means being arranged in such relation to the flowing fluid that a transfer of heat will take place between them, varying the heating current to maintain said means at a constant temperature, and determining the flow by measuring the heating current.

6. The method of measuring the flow of steam, air and other fluids, which comprises supplying energy to heat an electric resistance means arranged in such relation to the flowing fluid that its temperature is affected by the fluid to a degree dependent upon the rate of flow, the resistance of said means varying with its temperature, and varying the supply of energy to maintain the resistance of said means constant.

7. The method of measuring the flow of steam, air and other fluids, which comprises heating an electrical resistance device by an electric current, said device being exposed to the mean velocity of the flowing stream of fluid so that a transfer of heat takes place between the fluid and said device, the resistance of the device varying with its temperature, varying the heating current to keep the resistance of the device constant, and determining the flow by measuring the heating current.

8. In an apparatus for measuring the flow of fluids, the combination of a radiator so arranged that its temperature is affected by the fluid, a source supplying energy to the radiator, means connecting the source and the radiator, means for regulating the supply of energy to the radiator to maintain it at a constant temperature, and a device controlled by said supply of energy that shows the flow of the fluid being measured.

9. In an apparatus for measuring the flow of fluids, the combination of a radiator so arranged that its temperature is affected by the fluid, a source supplying energy to the radiator, means connecting the source and the radiator, means for regulating the supply of energy to the radiator to maintain it at a temperature higher than the temperature of the fluid, and a device controlled by the energy supplied to the radiator and showing the rate of flow of the fluid being measured.

10. In a fluid meter, the combination of a conduit through which the fluid flows, a radiator arranged in the conduit so that its temperature is affected by the flowing stream of fluid, a source supplying energy to the radiator, means connecting the source and the radiator, means for regulating the supply of energy to the radiator to maintain it at a constant temperature, and a device responsive to changes in the supply of energy to the radiator that shows the rate of flow of the fluid being metered.

11. In a fluid meter, the combination of a conduit through which the fluid flows, a radiator arranged in the conduit and exposed to the mean velocity of the fluid stream so that there is a transfer of heat between it and the flowing fluid, a source supplying energy to the radiator, means connecting the source and the radiator, means for regulating the supply of energy to the radiator to maintain it at a temperature higher than the temperature of the fluid, and a device responsive to the supply of energy to the radiator for showing the rate of flow of the fluid being metered.

12. In a fluid meter, the combination of an electrically heated radiator so arranged that there is a transfer of heat between it and the flowing fluid, a source supplying current to the radiator, means connecting the source and the radiator, means for regulating the supply of current to the radiator to maintain it at a constant temperature, and a device controlled by the heating current which shows the rate of flow of the fluid being metered.

13. In a fluid meter, the combination of a conduit through which the fluid flows, an electrical resistance device, whose resistance varies with its temperature, that is so arranged that its temperature is affected by the flowing fluid to a degree dependent upon the rate of flow, a source supplying electrical energy to heat said device, means connecting the source and the device, means for varying the supply of energy to keep the resistance of the device constant, and means controlled by the supply of energy to the device for showing the rate of flow.

14. In a fluid meter, the combination of a conduit through which the fluid flows, an electric resistance device arranged in the conduit so that its temperature is affected by the flowing fluid, a source supplying current to heat said device, means connecting the source and the device, means for varying the current to maintain the device at a temperature higher than the temperature of the fluid, and means responsive to the current flowing in the circuit that shows the rate of flow of the fluid being metered.

15. In a fluid meter, the combination of a conduit through which the fluid flows, an electric resistance device arranged in the conduit so that its temperature is affected by the flowing fluid, a source supplying current to heat the device, a variable resistance in circuit with said source and device, means for varying said resistance to vary the current supplied to the device to maintain it at a constant temperature, and means controlled by the heating current that shows the rate of flow of the fluid being metered.

16. In a fluid meter, the combination of a conduit through which the fluid flows, an electric resistance device arranged in the conduit so that there is a transfer of heat between it and the flowing fluid, a source supplying current to heat said device, means for showing the temperature condition of the device, a variable resistance in circuit with said source and device for varying the current to maintain the device at a constant temperature, and means responsive to the current flowing in the circuit that shows the rate of flow of the fluid being measured.

17. In a fluid meter, the combination of a conduit through which the fluid flows, an electric resistance device arranged in the conduit so that there is a transfer of heat between it and the flowing fluid, a source supplying current to heat the device, means that indicates the temperature condition of the device, said means comprising a pivoted member, an element that exerts a torque on said member in one direction that is proportional to the current flowing through the device, and another element that exerts a torque in the opposite direction that is proportional to the electromotive force impressed on the device, a variable resistance in circuit with said source and device for regulating the current to maintain the temperature of the device constant, and means controlled by the current flowing in the circuit that shows the rate of flow of the fluid being measured.

18. In a fluid meter, the combination of a conduit through which the fluid flows, an electrical resistance device so arranged that its temperature is affected by the flowing fluid, a source supplying current to heat the device, a variable resistance in circuit with said source and device, means responsive to the temperature condition of said device for regulating said resistance to vary the current and thereby maintain the device at a constant temperature, and means controlled by the current flowing in the circuit that shows the rate of flow of the fluid being measured.

19. In a fluid meter, the combination of a conduit through which the fluid flows, an electric resistance device arranged in the conduit so that there is a transfer of heat between it and the flowing fluid, a source supplying current to heat the device to a temperature higher than the temperature of the fluid, a connection between the source and the resistance device, a rheostat for regulating the current supplied to the device to maintain it at a constant temperature, a motor for operating the rheostat, means for controlling the motor that is responsive to changes in the temperature condition of said device, and means actuated by the heating current that shows the rate of flow of the fluid being measured.

20. In a fluid meter, the combination of a conduit through which the fluid flows, an electric resistance device arranged diametrically across the conduit, a source supplying current to heat the device to a temperature higher than the temperature of the fluid, an adjustable resistance in circuit with said source and device, means responsive to changes in the temperature of said device for adjusting said resistance to vary the current and thereby maintain the device at a constant temperature, and means controlled by the heating current that shows the rate of flow of the fluid being measured.

21. In a fluid meter, the combination of a conduit through which the fluid flows, a heated wire arranged diametrically across the conduit and the stream of fluid flowing therethrough, a source of electric energy connected to the ends of the wire so that current will flow through the wire and heat it due to its resistance to a temperature higher than the temperature of the fluid, an adjustable resistance in circuit with said source and wire, means responsive to changes in the temperature of the wire for adjusting said resistance to vary the current and thereby maintain the wire at a constant temperature and resistance, and means controlled by the heating current that shows the rate of flow of the fluid being measured.

22. The method of measuring the flow of fluids, which comprises determining the amount of energy required to maintain at constant temperature, a body whose temperature condition is affected by the flowing fluid.

In witness whereof, I have hereunto set my hand this 21st day of April, 1914.

ERNST J. BERG.

Witnesses:
LYNDE D. HOKERK,
BENJAMIN B. HULL.